United States Patent [19]

Stenger et al.

[11] Patent Number: 5,219,002

[45] Date of Patent: Jun. 15, 1993

[54] MULTILAYERED POLYAMIDE-BASED SYNTHETIC SAUSAGE CASING

[75] Inventors: Karl Stenger, Ruedesheim/Rhein; Guenther Crass, Taunusstein; Dieter Beissel, Wiesbaden, all of Fed. Rep. of Germany

[73] Assignee: Hoechst Aktiengesellschaft, Frankfurt am Main, Fed. Rep. of Germany

[21] Appl. No.: 642,355

[22] Filed: Jan. 17, 1991

[30] Foreign Application Priority Data

Jan. 17, 1990 [DE] Fed. Rep. of Germany ....... 4001131

[51] Int. Cl.$^5$ .............................. F16L 11/12
[52] U.S. Cl. ................. 138/118.1; 138/137; 428/34.8
[58] Field of Search ...... 138/118.1, 137, 140, 138/141; 428/34.8, 34.9; 426/105, 135, 138

[56] References Cited

U.S. PATENT DOCUMENTS

| | | | |
|---|---|---|---|
| 4,183,882 | 1/1980 | Weinberg et al. | 138/118.1 |
| 4,197,326 | 4/1980 | Nakamatsu et al. | 138/118.1 |
| 4,243,074 | 1/1981 | Strutzel et al. | 138/118.1 |
| 4,303,711 | 12/1981 | Erk et al. | 138/118.1 |
| 4,391,302 | 7/1983 | Hahn et al. | 138/118.1 |
| 4,391,862 | 7/1983 | Bornstein | 428/34.8 |
| 4,399,839 | 8/1983 | Hutschenreuter et al. | 138/118.1 |
| 4,448,792 | 5/1984 | Schirmer | 138/118.1 |
| 4,486,507 | 12/1984 | Schumacher | 428/476.1 |
| 4,606,922 | 8/1986 | Schirmer | 426/412 |
| 4,649,962 | 3/1987 | Vinokur | 428/34.8 |
| 4,659,599 | 4/1987 | Strutzel | 138/118.1 |
| 4,764,406 | 8/1988 | Hisazumi et al. | 428/35 |
| 4,851,245 | 7/1989 | Hisazumi et al. | 426/105 |
| 4,888,223 | 12/1989 | Sugimoto et al. | 428/34.9 |
| 4,892,765 | 1/1990 | Hisazumi et al. | 428/34.8 |
| 4,897,274 | 1/1990 | Candida et al. | 428/34.8 |
| 4,897,295 | 1/1990 | Erk et al. | 428/34.8 |
| 4,944,970 | 7/1990 | Stenger | 428/34.8 |
| 5,037,683 | 8/1991 | Schirmer | 428/34.8 |
| 5,047,253 | 9/1991 | Juhl et al. | 138/118.1 |

FOREIGN PATENT DOCUMENTS

| | | | |
|---|---|---|---|
| 3212344 | 10/1983 | Fed. Rep. of Germany . | |
| 1394590 | 5/1964 | France . | |
| 2184437 | 7/1990 | Japan | 428/34.8 |
| 2035198 | 6/1980 | United Kingdom | 428/34.8 |
| 2117702 | 10/1983 | United Kingdom . | |

OTHER PUBLICATIONS

Chemical Abstracts, Band 102, Nr. 16, Apr. 1985, Seiten 55-56, Zusammenfassung Nr. 133244d, Columbus, Ohio, U.S.; & JP-A-59 216 536 (Okura Industrial Co., Ltd) Jun. 12, 1984.

*Primary Examiner*—James E. Bryant, III
*Attorney, Agent, or Firm*—Foley & Lardner

[57] ABSTRACT

A multi-layered tubular synthetic sausage casing which includes an outer polyamide layer, an inner polyolefin layer and an intermediate layer for mutually bonding the inner and outer layers. The inner polyolefin layer includes a copolymer comprised of units of ethylene, propylene or straight-chain alpha-olefins having 4 to 8 carbon atoms, or of a mixture of these copolymers. In a preferred embodiment, the polyolefin layer is comprised of an ethylene/propylene/butylene terpolymer and/or of a propylene/butylene copolymer.

19 Claims, No Drawings

MULTILAYERED POLYAMIDE-BASED SYNTHETIC SAUSAGE CASING

BACKGROUND OF THE INVENTION

The present invention relates to a multilayered tubular synthetic sausage casing comprising an outer layer based on polyamide, an inner layer of polyolefin which is in contact with the enclosed matter, i.e., in particular, with the sausage meat, and an intermediate layer, by means of which the outer and inner layers are bonded to one another.

Conventional packaging casings of this general type have the disadvantage that following the simmering or cooking of the casing stuffed with sausage meat the internal casing wall is no longer in contact with the sausage meat. Hollow spaces have formed between the sausage meat and the casing, as a result whereof liquid constituents may exude from the sausage meat and penetrate into these hollow spaces. The casing no longer surrounds the sausage meat tightly and closely, but has a creased appearance. After the cooling down of the sausage, undesired jelly pockets form in the interspace between the casing and the sausage meat, giving the sausage such an unattractive appearance that it can no longer be offered for sale.

According to DE-A-33 08 296, this problem is said to be overcome by keeping the outer polyamide layer of a tubular casing having the above described layer build-up in a crystallized and moistened state. Following the tight stuffing of the tubing with a hot, pasty foodstuff, the outer polyamide layer dries out, so that following the cooling down, the tubular casing is said to shrink elastically and tightly onto its contents. This process is, however very complicated and has not gained general acceptance in practice.

According to the teaching of DE-A-38 16 942, the formation of creases can be avoided by treating the internal layer of polyolefin resin with a corona discharge and optionally applying starch powder to it. U.S. Pat. No. 4,606,922 provides still another solution to the problem. According to this patent, an ionomer that can be treated with ionizing radiation is used for the internal side of the casing. These more recently proposed solutions have the disadvantage that an additional treatment of the polyolefin layer is required to prevent the formation of creases and jelly pockets.

SUMMARY OF THE INVENTION

It is therefore an object of the present invention to provide a tubular synthetic sausage casing having a multilayered film structure comprising polyamide, adhesive and polyolefin, which, after being stuffed with sausage meat, heated and cooled, fits in a tight and crease-free manner to the sausage meat surrounded by said casing.

On accomplishing the foregoing object, there is provided according to the present invention a synthetic sausage casing comprising an outer layer comprised of polyamide, an inner layer and an intermediate layer for mutually bonding said inner and outer layers, wherein said inner layer comprises at least one polyolefin copolymer which includes units selected from the group consisting of ethylene, propylene and a straight-chain alphaolefin having 4 to 8 carbon atoms. Preferably, the outer layer comprises a polyamide which includes at least one unit selected from the group consisting of an aliphatic dicarboxylic acid, an aliphatic diamine, an omega-aminocarboxylic acid and a lactam of an omega-aminocarboxylic acid. Preferably, the intermediate layer comprises a modified polyolefin resin selected from the group consisting of an ethylene/vinyl acetate copolymer, HDPE, rubber-modified HDPE and alkyl-carboxyl-substituted polyolefin.

Further objects, features and advantages of the present invention will become apparent from the detailed description of preferred embodiments that follows.

DETAILED DESCRIPTION OF THE PREFERRED EMBODIMENTS

The tubular sausage casing according to the present invention has a multilayered structure comprising an outer polyamide layer, an intermediate, relatively thin adhesive or adhesion-promoting layer and an inner polyolefin layer.

The polyamide layer is comprised of a reaction product of a preferably aliphatic, saturated dicarboxylic acid and at least one preferably aliphatic, saturated diamine. The aliphatic dicarboxylic acid preferably has 4 to 10 carbon atoms. Examples of preferred dicarboxylic acids include terephthalic acid and isophthalic acid, particular preference being given to adipic acid, azelaic acid, sebacic acid and dodecane dicarboxylic acid. The aliphatic diamine preferably has 4 to 8 carbon atoms. Examples of preferred diamines include phenylene diamine and xylylene diamine, particular preference being given to tetra, penta-, hexa- and octamethylene diamine, among which hexamethylene diamine is especially preferred. Furthermore, the polyamide may also be comprised of units of omega-aminocarboxylic acids having 6 to 12 carbon atoms or the lactams thereof, such as units of 11-amino-undecanoic acid or lauric lactam, preferably caprolactam. The polyamide may furthermore comprise at least one copolyamide including several of the diamine and dicarboxylic acid units mentioned above. A preferred copolyamide is comprised of caprolactam, hexamethylene diamine and adipic acid units. Polyamide-6, polyamide-66 and polyamide-6/66 are particularly preferred polyamides.

In a preferred embodiment of the present invention, the polyamide layer includes additional polymers, preferably about 5 to 25% by weight of polyester, such as those disclosed in U.S. Pat. No. 4,659,599. Addition of a polyester facilitates, biaxial stretching of the tubing, i.e., the required tensile force is reduced unexpectedly. This preferred embodiment is also distinguished by an excellent dimensional stability, so that large-diameter sausages produced therefrom do not bulge or expand due to the weight of the sausage meat when hanging.

The polyester present in the polymer mixture is a condensation product obtained from diols and aromatic dicarboxylic acids, in particular terephthalic acid and optionally also isophthalic acid. To a small extent, the polyester may be modified with aliphatic dicarboxylic acids, such as adipic acid. The diols in particular are aliphatic compounds of the formula $HO-(CH_2)_n-OH$ ($n=2-8$), such as ethylene glycol, 1,4-butylene glycol, 1,3-propylene glycol or hexamethylene glycol, or alicyclic compounds, such as 1,4-cyclohexane dimethanol. Particularly preferred is polybutylene terephthalate. The maximum proportion of the polyester present is about 25% by weight, relative to the polymer mixture.

The polyolefin used for the internal tubing wall of the present invention is a copolymer of ethylene, propylene or straight-chain alpha-olefins having 4 to 8 carbon atoms or a mixture of these polymers. The proportion of alpha-olefins having 4 to 8 carbon atoms typically is less than 10% by weight. Preferably, the copolymer is an ethylene/propylene/butylene terpolymer and/or a propylene/butylene copolymer. A terpolymer/copolymer mixture in a weight ratio of about 6:4 to 4:6, preferably of about 1:1, is particularly suitable. The terpolymer advantageously contains about 0.8 to 2% by weight of ethylene units and about 2 to 3.5% by weight of butylene units, and the remainder are propylene units. The copolymer generally comprises about 60 to 75% by weight of propylene units and about 40 to 25% by weight of butylene units. If a terpolymer/copolymer mixture is used, this mixture contains a total of about 0.1 to 7% by weight of ethylene units, about 53 to 89.9% by weight of propylene units and about 10 to 40% by weight of butylene units. A polyolefin which is commercially available from Mitsui Petrochemical Industries Ltd. under the tradename of TAFMER XR-106L, has found to be particularly suitable. TAFMER XR-106L comprises a mixture of an ethylene/propylene/butylene terpolymer and a propylene/butylene copolymer. This mixture includes 0.5% by weight of ethylene units, 77.5% by weight of propylene units and 22% by weight of butylene units.

Apart from the $C_2/C_3/C_4$ terpolymers and the $C_3/C_4$ copolymers mentioned above, the inner layer optionally includes other polyolefins, in particular polyethylene, such as LDPE, LLDPE, propylene homo-polymer and/or $C_2/C_3$ copolymer. In general, their amount is less than about 50% by weight, relative to the inner layer.

The intermediate layer bonds the polar polyamide layer to the nonpolar polyolefin layer and is comprised of a chemically modified polyolefin selected from the group including ethylene/vinyl acetate copolymers, HDPE, and rubber-modified HDPE. The chemical modification is effected via functional groups on the polymer, which accomplish a strong binding to the polyamide of the outer layer. These include mixtures of graft copolymers of HDPE and at least one unsaturated cyclic carboxylic anhydride, in admixture with copolymers of ethylene and an ethylenically unsaturated ester and/or in admixture with polyolefin resin based on homo- or copolymers of ethylene with an alpha-olefin having 3 to 8 carbon atoms. Furthermore, alkylcarboxyl-substituted polyolefins, e.g., ionomers, and acrylates or methacrylates can be employed as the adhesive.

The sausage casing is coextruded through a multilayer die, as a seamless three-layered tubing. Subsequently, the material can be biaxially oriented without any problem. Following the stretching process the tubing is optionally heat-set in order to render it sufficiently resistant to shrinking under the action of heat. The diameter of the tubing is selected in accordance with the desired sausage diameter. When the casing is used for cooked sausages, it usually has a diameter of about 30 to 150 mm, in particular of about 40 to 120 mm. In general, the outer layer has a thickness of about 20 to 35μm, the polyolefin layer has a thickness of about 5 to 20μm, and the intermediate layer has a thickness of about 1 to 8μm.

If desired, the sausage casings can be dyed. In the case of three-layered casings it is advantageous to dye the outer polyamide layer only, since thereby the problem of dyestuff migration through the film layers and to the sausage meat is reduced.

The permeability of the present sausage casing to steam is very low. The tendency towards formation of jelly pockets and creases on the ready-for-use sausage is substantially reduced.

Despite its low wall thickness, the biaxially stretch-oriented tubular casing according to the present invention exhibits high strength and a uniform caliber. It is dimensionally stable and can be closed by clips. The three-layered composite tubing is inseparable under the conditions existing during sausage production, i.e., even when the sausages are simmered and cooked in boiling water or are stored at temperatures just a few degrees above 0° C., no delamination of the individual layers of the casing occurs.

The term "oriented" or "orientation" refers to the improvement of the properties of an orientable polymeric thermoplastic material, which can be achieved by subjecting said material to a stretching treatment, in the course of which a molecular orientation of the material in the direction of stretching is achieved within the orientation temperature range of said material, and the state thus accomplished is "frozen", i.e., maintained by a subsequent chilling step. By such an orientation treatment, the mechanical properties and the barrier values of a film are improved. Tubular films are subjected to biaxial, simultaneous stretching, which results in a biaxial orientation of the tubing.

The casing according to the present invention is produced in a way similar to the process described in U.S. Pat. No. 4,886,634. Instead of the tubular extrusion of the monolayered cast film, coextrusion of the tubular three-layered cast film is performed through a multilayer annular die.

The advantages achieved by the casing according to the present invention over non-oriented and oriented monolayered tubular polyamide casings and the advantages achieved by using the preferred polyolefinic inner layer instead of the customary PE inner layer in the case of an oriented multilayered PA casing are illustrated by the Example and Comparative Examples below.

EXAMPLE

Employing the coextrusion process, a coextrudate was forced through an annular die at a coextrusion temperature of 240° C. The product was chilled to give a tubular film having a diameter of 19 mm and a wall thickness of 0.29 mm. The tubular film was heated and subjected to simultaneous, biaxial stretching within a stretching zone. The stretch ratios were as follows:
Transverse: 1 : 3.15
Longitudinal: 1 : 2.5

In this way, a three-layered tubular film having a diameter of 60 mm and a wall thickness of 0.036 mm was obtained. The tubing had the following structure:
Outer layer: 20μm, PA-6 (GRILON F 40)
Central layer: 5μm, adhesion promoter (PLEXAR 130) Inner layer: 11μm, PO (TAFMER XR 106L)
PLEXAR 130 is an extrudable adhesive resin, which is based on a modified, medium-density polyethylene.

In a further process step the casing was heat-set while being kept in the blown-up state in order to avoid shrinking in the longitudinal or transverse direction. Before being laid flat, the casing was chilled, in order to prevent blocking. The resulting tubular film did not shrink or did not shrink substantially at temperatures below 80° C, but it was highly transparent and showed good strength. It could be converted into a sausage casing and stuffed with sausage meat without problem.

Tight sausages were obtained after cooking and cooling down.

COMPARATIVE EXAMPLE 1

Example 1 was repeated except that a HDPE (LUPOLEN 2441D) without further additives was used for the inner layer.

COMPARATIVE EXAMPLE 2

Example 1 was repeated except that the melts for the intermediate layer and for the inner layer were stopped and the output rate for the outer layer was increased, such that a cast tubular film having a wall thickness of 280μm and finally a monolayered oPA-6 tubing resulted.

COMPARATIVE EXAMPLE 3

A blown film having a laid-flat width of 98 mm and an average wall thickness of 47μm was produced from a PA-66(ULTRAMID A5) in a vertically aligned film blowing unit equipped with a downward-pointing die, at an extrusion temperature of 280° C.

The superior properties of the film according to the present invention, produced as described in Example 1 are clearly illustrated in the tables below. It is true that the comparative casings exhibit good results for a few of the particular properties tested, but none of these casings displayed good results for all the following requirements:

| | |
|---|---|
| Casing strength and constant caliber | (clipping strength, no bulging during stuffing and cooking, no tag formation) |
| Tight fitting of the casing to the sausage | (no formation of jelly, satisfactory adhesion to meat |
| Low weight loss | meat in production of cooked sausages) (high barrier towards steam, tight sausages even after storage in cold chamber for 6 weeks) |

The only sausage casing that meets all requirements is the multi-layered, biaxially stretch-oriented PA-casing having a polyolefinic internal layer, produced in accordance with the present invention as described in Example 1.

TABLE 1

Basic Properties of the Casings

| | Wall thickness [μm] | Flat Width [mm] | Tensile strength l/q [N/mm$^2$] | Elongation at break l/q [%] | WDD [g/m$^2$d] |
|---|---|---|---|---|---|
| Example | 36 | 88 | 100/78 | 150/57 | 4 |
| Comp. Example 1 | 35 | 90 | 108/86 | 131/48 | 5 |
| Comp. Example 2 | 39 | 93-95 | 178/268 | 160/80 | 17 |
| Comp. Example 3 | 47 | 98 | 79/74 | 276/305 | 13 |

The technical data were determined by means of the following methods:

| Tested Property | Test Standard |
|---|---|
| Tensile strength | DIN 53455 |
| Elongation at break | DIN 53455 |
| WDD (permeability to steam) | DIN 53122 |

TABLE 2

Practical Test by Way of Sausage Production

| | Properties during stuffing | Visual assessment after production of cooked sausages | Deposition of jelly [%] | Weight loss per week [%] | Appearance after storage in cold chamber for 6 weeks |
|---|---|---|---|---|---|
| Example | can be stuffed tightly, constant caliber, cylindrical casing, i.e., sausage | satisfactory, rounded-off ends; hardly any jelly deposition | 0.4 | 0 | tight |
| Comp. Example 1 | can be stuffed tightly, constant caliber, cylindrical casing, i.e., sausage | satisfactory, rounded-off ends; massive jelly deposition at ends and on circumferential surface | 3.9 | 0 | tight |
| Comp. Example 2 | can be stuffed tightly, constant caliber, cylindrical casing, i.e., sausage | satisfactory, rounded-off ends; low jelly deposition at ends and on circumferential surface | 0.6 | 1.2 | creased, not suitable for sale |
| Comp. Example 3 | cannot be stuffed tightly, bulges form esp. in areas of low wall thickness | unsatisfactory formation of ends; long tags; low jelly deposition at ends and on | 0.6 | 0.8 | no creases, but no tight sausage |

TABLE 2-continued

| | Practical Test by Way of Sausage Production | | | |
|---|---|---|---|---|
| Properties during stuffing | Visual assessment after production of cooked sausages | Deposition of jelly [%] | Weight loss per week [%] | Appearance after storage in cold chamber for 6 weeks |
| | circumferential surface | | | |

What is claimed is:

1. A coextruded biaxially stretched, heat set, synthetic multilayered sausage casing comprising an outer layer comprised of polyamide, an inner polyolefin layer and an intermediate layer for mutually bonding said inner and outer layers, wherein said inner polyolefin layer comprises at least one polyolefin copolymer which includes units selected from at least two of the group consisting of ethylene, propylene and straight-chain alpha-olefins having 4 to 8 carbon atoms, wherein said inner polyolefin layer is not corona-treated.

2. A sausage casing according to claim 1, wherein said inner layer comprises at least one polyolefin selected from the group consisting of an ethylene/propylene/butylene terpolymer and a propylene/butylene copolymer.

3. A sausage casing according to claim 2, wherein said inner layer further comprises at least one polyolefin selected from the group consisting of polyethylene, polypropylene and ethylene/propylene copolymer.

4. A sausage casing according to claim 2, wherein said inner layer comprises a mixture of said ethylene/propylene/butylene terpolymer and said propylene/butylene copolymer and includes about 0.1 to 7 weight % of ethylene and about 10 to 40 weight % of butylene, wherein the remainder is substantially propylene.

5. A sausage casing according to claim 2, wherein said inner layer comprises said ethylene/propylene/butylene terpolymer, wherein said ethylene/propylene/butylene terpolymer comprises about 0.8 to 2 weight % of ethylene and about 2 to 3.5 weight % of butylene, wherein the remainder is propylene.

6. A sausage casing according to claim 2, wherein said inner layer comprises said propylene/butylene copolymer, wherein said propylene/butylene copolymer comprises about 60 to 75 weight % of propylene and about 25 to 40 weight % of butylene.

7. A sausage casing according to claim 1, wherein said outer layer further comprises about 5 to about 25 weight % of polyester.

8. A sausage casing according to claim 7, wherein said polyester comprises polybutylene terephthalate.

9. A sausage casing according to claim 1, wherein said outer layer comprises a polyamide which includes at least one unit selected from the group consisting of an aliphatic dicarboxylic acid, an aliphatic diamine, an omega-aminocarboxylic acid, and a lactam of an omega-aminocarboxylic acid.

10. A sausage casing according to claim 9, wherein aid at least one unit comprises an aliphatic dicarboxylic acid having 4 to 10 carbon atoms.

11. A sausage casing according to claim 9, wherein said at least one unit comprises an aliphatic diamine having 4 to 8 carbon atoms.

12. A sausage casing according to claim 9 wherein said at least one unit comprises an omega-aminocarboxylic acid having 6 to 12 carbon atoms.

13. A sausage casing according to claim 9, wherein said outer layer comprises a polyamide which includes at least one unit selected from the group consisting of caprolactam, hexamethylene diamine and adipic acid.

14. A sausage casing according to claim 1, wherein said intermediate layer comprises a modified polyolefin resin selected from the group consisting of an ethylene/vinyl acetate copolymer, HDPE, rubber-modified HDPE and alkyl-carboxyl-substituted polyolefin.

15. A sausage casing according to claim 1, wherein said intermediate layer comprises at least one polymeric compound selected from the group consisting of a graft polymer obtained from HDPE and at least one unsaturated cyclic carboxylic acid anhydride, a copolymer of ethylene and an ethylenically-unsaturated ester, and a polyolefin resin based on homo- or copolymers of ethylene and an alpha-olefin having 3 to 8 carbon atoms.

16. A sausage casing according to claim 4, wherein the terpolymer/copolymer weight ratio is about 6:4 to 4:6.

17. A sausage casing according to claim 16, wherein said ratio is about 1:1.

18. A sausage casing according to claim 1, wherein the outer layer has a thickness of about 20 to 35 microns, the polyolefin layer has a thickness of about 5 to 20 microns, and the intermediate layer has a thickness of about 1 to 8 microns, and wherein the diameter of the casing is about 30 to 150 mm..

19. A sausage encased by a casing according to claim 1.

* * * * *